United States Patent
Myllymäki (10) Patent No.: US 9,884,767 B2
(45) Date of Patent: Feb. 6, 2018

(54) ZETA POSITIVE HYDROGENATED NANODIAMOND POWDER, ZETAPOSITIVE SINGLE DIGIT HYDROGENATED NANODIAMOND DISPERSION, AND METHODS FOR PRODUCING THE SAME

(71) Applicant: Carbodeon Ltd Oy, Vantaa (FI)

(72) Inventor: Vesa Myllymäki, Helsinki (FI)

(73) Assignee: CARBODEON LTD OY, Vantaa (FI)

(*) Notice: Subject to any disclaimer, the term of this patent is extended or adjusted under 35 U.S.C. 154(b) by 0 days.

(21) Appl. No.: 14/893,942

(22) PCT Filed: May 30, 2014

(86) PCT No.: PCT/FI2014/050434
§ 371 (c)(1),
(2) Date: Nov. 25, 2015

(87) PCT Pub. No.: WO2014/191633
PCT Pub. Date: Dec. 4, 2014

(65) Prior Publication Data
US 2016/0115033 A1    Apr. 28, 2016

(30) Foreign Application Priority Data
May 31, 2013  (FI) ..................... 20135605

(51) Int. Cl.
*B82Y 30/00* (2011.01)
*C01B 31/06* (2006.01)
*B01J 13/00* (2006.01)
*C01B 32/28* (2017.01)

(52) U.S. Cl.
CPC ......... *C01B 31/065* (2013.01); *B01J 13/0026* (2013.01); *B82Y 30/00* (2013.01); *C01B 32/28* (2017.08)

(58) Field of Classification Search
CPC ...... B01J 13/0026; C01B 32/28; C01B 32/25; C01B 32/15; B82Y 30/00
See application file for complete search history.

(56) References Cited

U.S. PATENT DOCUMENTS

2009/0218276 A1    9/2009  Linford et al.
2012/0315212 A1*  12/2012  Williams .............. B82Y 30/00
                                                  423/446
2015/0182624 A1*   7/2015  Petit .................... A61K 9/0009
                                                  428/402
(Continued)

FOREIGN PATENT DOCUMENTS

WO         2009060613 A1    5/2009

OTHER PUBLICATIONS

Finnish Patent and Registration Office Office Action and Search Report on FI20135606 dated Mar. 27, 2014.
(Continued)

*Primary Examiner* — Michael A Salvitti
(74) *Attorney, Agent, or Firm* — Berggren Inc.

(57) ABSTRACT

The present invention relates to a method for producing zeta positive hydrogenated nanodiamond particles, and to a method for producing zeta positive single digit hydrogenated nanodiamond dispersions. The present invention further relates to zeta positive hydrogenated nanodiamond powder and zeta positive single digit hydrogenated nanodiamond dispersion.

9 Claims, 8 Drawing Sheets (56) References Cited

U.S. PATENT DOCUMENTS

2016/0115033 A1* 4/2016 Myllymaki .......... B01J 13/0026
516/32

OTHER PUBLICATIONS

Katherine B. Holt et al: "Redox properties of undoped 5 nm diamond nanoparticles", Physical Chemistry Chemical Physics, vol. 10, No. 2, Oct. 22, 2007 (Oct. 22, 2007), pp. 303-304, XP055134117, ISSN: 1463-9076, DOI: 10.1039/b711049a.

Jakob Hees et al: "Electrostatic self-assembly of diamond nanoparticles", Chemical Physics Letters, Elsevier BV, NL, vol. 509, No. 1, Apr. 25, 2011 (Apr. 25, 2011), pp. 12-15, XP028220352, ISSN: 0009-2614, DOI: 10.1016/J.CPLETT.2011.04.083 [retrieved on May 1, 2011].

Oliver A Williams et al: "Size-dependent reactivity of diamond nanoparticles", ACS Nano, American Chemical Society, US, vol. 4, No. 8, Aug. 24, 2010 (Aug. 24, 2010), pp. 4824-4830, XP002633636, ISSN: 1936-0851, DOI: 10.1021/NN100748K [retrieved on Jul. 12, 2010].

Girard HA et al: "Surface properties of hydrogenated nanodiamonds: a chemical investigation", Physical Chemistry Chemical Physics, Royal Society of Chemistry, Cambridge, GB, vol. 13, No. 24, Jun. 28, 2011 (Jun. 28, 2011), pp. 11517-11523, XP002697336, ISSN: 1463-9076, DOI: 10.1039/C1CP20424F [retrieved on May 12, 2011].

Spitsyn B V et al: "The physical-chemical study of detonation nanodiamond application in adsorption and chromatography", Diamond and Related Materials, Elsevier Science Publishers, Amsterdam, NL, vol. 19, No. 2-3, Nov. 4, 2009 (Nov. 4, 2009), pp. 123-127, XP026877166, ISSN: 0925-9635 [retrieved on Nov. 4, 2009].

M. Ozawa et al: "Preparation and Behavior of Brownish, Clear Nanodiamond Colloids", Advanced Materials, vol. 19, No. 9, May 7, 2007 (May 7, 2007), pp. 1201-1206, XP055133796, ISSN: 0935-9648, DOI: 10.1002/adma.200601452.

A. Kruger et al: "Functionality is Key: Recent Process in the Surface Modification of Nanodiamond", Advanced Functional Materials, Wiley-VCH Verlag GmbH & Co. KGaA, Weinheim, DE, vol. 22, Jan. 16, 2012 (Jan. 16, 2012), pp. 890-906.

K-Y Teng et al: "Microstructure evolution and the modification of the electron filed emission properties of diamond films by gigaelectron volt Au-ion irradiation", AIP Advances 1, 042108 (2011), AIP Publishing, pp. 1-22, DOI: 10.1063/1.3651462.

* cited by examiner

ZETA POSITIVE HYDROGENATED NANODIAMOND POWDER, ZETAPOSITIVE SINGLE DIGIT HYDROGENATED NANODIAMOND DISPERSION, AND METHODS FOR PRODUCING THE SAME

PRIORITY

This application is a U.S. national application of international application number PCT/FI2014/050434 filed on May 30, 2014 and claiming priority of the Finnish national application FI20135605 filed on May 31, 2013, the contents of both of which are incorporated herein by reference in their entirety.

FIELD OF THE INVENTION

The present invention relates to a method for producing zeta positive hydrogenated nanodiamond powder and zeta positive single digit hydrogenated nanodiamond dispersion. The present invention further relates to zeta positive hydrogenated nanodiamond powder and zeta positive single digit hydrogenated nanodiamond dispersion.

BACKGROUND ART

Nanodiamond (ND) also referred to as ultrananocrystalline diamond or ultradispersed diamond (UDD) is a unique nanomaterial which can easily be produced in hundreds of kilograms by detonation synthesis.

Detonation nanodiamonds (ND) were first synthesized by researchers from the USSR in 1963 by explosive decomposition of high-explosive mixtures with negative oxygen balance in a non-oxidizing medium. A typical explosive mixture is a mixture of trinitrotoluene (TNT) and hexogen (RDX) and a preferred weight ratio of TNT/RDX is 40/60.

As a result of the detonation synthesis a diamond-bearing soot also referred to as detonation blend is obtained. This blend comprises nanodiamond particles, which typically have an average particle size of about 2 to 8 nm, and different kinds of non-diamond carbon contaminated by metals and metal oxide particles coming from the material of the detonation chamber. The content of nanodiamonds in the detonation blend is typically between 30 and 75% by weight.

The nanodiamond-containing blends obtained from the detonation contain same hard agglomerates, typically having a diameter of above 1 mm. Such agglomerates are difficult to break. Additionally the particle size distribution of the blend is very broad.

The diamond carbon comprises $sp^3$ carbon and the non-diamond carbon mainly comprises $sp^2$ carbon species, for example carbon onion, carbon fullerene shell, amorphous carbon, graphitic carbon or any combination thereof.

There are number of processes for the purification of the detonation blends. The purification stage is considered to be the most complicated and expensive stage in the production of nanodiamonds.

For isolating the end diamond-bearing product, a complex of chemical operations directed at either dissolving or gasifying the impurities present in the material are used. The impurities, as a rule, are of two kinds: non-carbon (metal oxides, salts etc.) and nondiamond forms of carbon (graphite, black, amorphous carbon).

Chemical purification techniques are based on the different stability of the diamond and non-diamond forms of carbon to oxidants. Liquid-phase oxidants offer an advantage over gas or solid systems, because they allow one to obtain higher reactant concentrations in the reaction zone and, therefore, provide high reaction rates.

In the recent years nanodiamonds have received more and more attention due to several existing applications within electroplating (both electrolytic and electroless), polishing, various polymer mechanical and thermal composites, CVD-seeding, oils and lubricant additives as well as possible new applications such as luminescence imaging, drug delivery, quantum engineering etc.

The fact that the available nanodiamond materials possess a variety of various surface functions and thus agglomeration (from several hundreds of nanometers to several microns), is effectively limiting their use in industrial applications. As applying agglomerating nanodiamond grades, very high filler loadings are typically required, making their cost efficient use impossible in most of the applications today. Moreover, nanodiamond agglomeration is effectively limiting or prohibiting the optimization of various application end product technical properties. Agglomeration is making it impossible to use nanodiamonds in applications wherein the product optical properties have to be retained; agglomeration is causing scratching in polishing and finepolishing applications; agglomeration can have a direct adverse effect on polymer composite mechanical properties; agglomeration in an electroplating electrolyte or electroless deposition chemicals (due to non-optimal nanodiamond zeta potential as in relation to electrolyte pH regime) makes their usage impossible or economically ineffective for manufacturing mechanically improved metal coatings; agglomeration is effectively prohibiting nanodiamond usage as a drug carrier material; agglomeration is having an adverse effect on CVD produced diamond film quality etc.

Cost efficient and technologically optimized usage of nanodiamond materials both in their powder, suspension and dispersion form can only be achieved if nanodiamonds are substantially mono-functionalized type and have thus, depending on the type of surface modification, the highest possible affinity to various solvents and polymer, metal or ceramic materials. Such a substantially mono-functionalized nanodiamond possesses, depending on the type of surface functionalization, either a highly positive or negative zeta potential value.

The significance of zeta potential is that its value can be related to the stability of colloidal dispersions. The zeta potential indicates the degree of repulsion between adjacent, similarly charged particles in dispersion or suspension. For molecules and particles that are small enough, a high zeta potential will confer stability, i.e., the solution or dispersion will resist aggregation. When the potential is low, attraction exceeds repulsion and the dispersion will break and flocculate. Therefore, colloids with high zeta potential (negative or positive) are electrically stabilized while colloids with low zeta potentials tend to coagulate or flocculate. If the zeta potential is 0 to ±5 mV, the colloid is subjected to rapid coagulation or flocculation. Zeta potential values ranging from ±10 mV to ±30 mV indicate incipient instability of the colloid (dispersion), values ranging from ±30 mV to ±40 mV indicate moderate stability, values ranging from ±40 mV to ±60 mV good stability as excellent stability is reached only with zeta potentials more than ±60 mV.

Several methods for functionalizing the nanodiamonds with different functional groups have been developed. Typical functionalized nanodiamonds are hydrogenated nanodiamonds, carboxylated nanodiamonds and hydroxylated nanodiamonds, but contain still a mixture of typically oppositely charged functions and thus, mediocre zeta potential values and are thus not available in their solvent dispersion forms.

Publication A. Krueger and D. Lang, Adv. Funct. Mater. 2012, 22, 890-906 discloses methods for hydrogenating nanodiamonds by applying hydrogen gas at elevated temperature. These methods, however, have disadvantages. For example, in addition to formation of C—H bonds, an increase in the amount of OH— groups is observed.

The publication A. Krueger and D. Lang, Adv. Funct. Mater. 2012, 22, 890-906 further discloses methods to produce hydrogenated nanodiamonds in different types of plasma reactors.

US 2012/0315212 A1 discloses a method for obtaining hydrogenated diamond particles from aggregate structures which contain diamond particles with an average particle diameter of less than 10 nm. The aggregate structures are heated under a gas atmosphere such that the diamond particles are obtained from the aggregate structures. It is essential that the aggregate structures are heated under a gas atmosphere which, in terms of reactive gases, contains hydrogen gas in a proportion of at least 80%. Most preferably the diamond particles are heated in a pure hydrogen gas atmosphere. The heating under the gas atmosphere occurs preferably at a pressure of 10 mbar. The obtained diamond particles show zeta potential exceeding +30 mV at a pH range from 3 to 7. Preferably the obtained nanodiamond particles are dispersed in deionized water.

Based on above disclosure, there is a qualitative and quantitative need for an efficient method for producing zeta positive hydrogenated nanodiamond powder and highly zeta positive single digit hydrogenated nanodiamond dispersions.

SUMMARY OF THE INVENTION

The present invention relates to a method for producing zeta positive hydrogenated nanodiamond powder according to claim 1.

The present invention further relates to a method for producing zeta positive single digit hydrogenated nanodiamond dispersion according to claim 7.

The present invention further relates to zeta positive hydrogenated nanodiamond powder according to claim 20.

The present invention further relates to zeta positive single digit hydrogenated nanodiamond dispersion according to claim 23.

It has now been surprisingly found that by heating nanodiamond particles at substantially ambient pressure under a gas atmosphere comprising hydrogen gas highly zeta positive hydrogenated nanodiamond powder can be produced. As the process is conducted without using pressurized conditions, the method of the present invention is safer, scalable and more economic compared to those methods where pressurized conditions are required.

It was also surprisingly found that by using one or more inert gases with hydrogen gas in the gas atmosphere, smaller concentration of hydrogen gas is needed to produce the highly zeta positive hydrogenated nanodiamond powder. Hydrogen gas concentration from 1 to 10% is sufficient for the method of the present invention. As the hydrogen gas concentration is low, the process itself is safer and more cost effective.

It was also surprisingly found that by further treating the zeta positive hydrogenated nanodiamond powder produced with the method of the present invention highly zeta positive single digit hydrogenated nanodiamond dispersions can be produced. The produced zeta positive hydrogenated nanodiamond powder can be dispersed into several liquid mediums to obtain highly zeta positive single digit hydrogenated nanodiamond dispersions.

DETAILED DESCRIPTION

By term "zeta positive nanodiamond" is meant a nanodiamond particle having a positive zeta potential.

By term "hydrogenated nanodiamond" is meant a nanodiamond particle having hydrogen functions on its surface.

By term "zeta positive hydrogenated nanodiamond" is meant a nanodiamond particle having hydrogen functions on its surface and having a positive zeta potential.

By term "zeta positive single digit hydrogenated nanodiamond" is meant a nanodiamond particle substantially in its primary particle form (also referred as to substantially in non-agglomerated form) having hydrogen functions on its surface and having a positive zeta potential.

By term "zeta positive single digit hydrogenated nanodiamond dispersion" is meant a dispersion of a liquid medium and nanodiamond particles where the nanodiamond particles are substantially present in their primary particle form and having hydrogen functions on theirs surface, and the dispersion having a positive zeta potential.

By particle size distribution D10 is meant that 10% of the particles are smaller than given particle size, and 90% of particles are larger than given particle size.

By particle size distribution D50 is meant that 50% of the particles are smaller than given particle size, and 50% of particles are larger than given particle size.

By particle size distribution D90 is meant that 90% of the particles are smaller than given particle size, and 10% of particles are larger than given particle size.

Zeta potentials referred in this description relate to zeta potentials measured in aqueous suspensions or dispersions.

In a first aspect of the present invention there is provided a method for producing zeta positive hydrogenated nanodiamond powder.

More particularly there is provided a method for producing zeta positive hydrogenated nanodiamond powder, the method comprising heating nanodiamond particles under a gas atmosphere comprising hydrogen gas at substantially ambient pressure, wherein hydrogen gas content in the gas atmosphere is 1-10%.

The precursor nanodiamond particles for producing the zeta positive hydrogenated nanodiamond powder may be essentially pure nanodiamond particles, preferably having a nanodiamond content of at least 87% by weight, more preferably at least 97% by weight. The nanodiamond particles may contain graphite and amorphous carbon originating from the production of the nanodiamonds. They may also contain some residual metal impurities, either as metals or in metal oxide form. The nanodiamond particles used as precursors for the hydrogenated nanodiamonds are commercially available.

The gas atmosphere comprises hydrogen gas. In order to avoid interferences during the heating process of the nanodiamond particles under the gas atmosphere by foreign substances preferably hydrogen gas is used with purity of at least 99.9%, more preferably at least, 99.999%. The hydrogen gas may be cleaned prior to introduction into a reaction chamber, for example, by via a palladium membrane. Hydrogen gas may be fed periodically or continuously into the reaction chamber. Hydrogen gas is commercially available.

In a preferred embodiment the gas atmosphere comprises additionally one or more inert gases. The inert gas can be any gas that is not chemically reactive. That is, the inert gas can be any gas that is not chemically reactive in the method of the present invention. Preferably the inert gas is selected from the group consisting of argon, nitrogen, helium, or a mixture thereof. Most preferably the inert gas is argon.

Preferably the heating of the nanodiamond particles under the gas atmosphere occurs in a reaction chamber with hydrogen gas and one or more inert gases being continuously guided through the reaction chamber during the heating. Hydrogen gas and one or more inert gases are guided continuously, as a mixture, through the reaction chamber with flow rate from 0.01 to 20 slpm (standard liter per minute), preferably from 0.1 to 15 slpm, and more preferably from 0.1 to 10 slpm.

Hydrogen gas content in the gas mixture guided through a reaction chamber is 1-10%, preferably 2-8%, and more preferably 3-7%. The hydrogen gas content relates to hydrogen content in reactive gas flow. The percentage relates here to the percentage of particles.

The reaction chamber may be any suitable reactor, known by a skilled person, which can be used in the present invention. The reaction chamber may be for example a suitable furnace.

The heating of the nanodiamond particles under the hydrogen comprising gas atmosphere occurs substantially at ambient pressure. In one embodiment the heating occurs at a pressure ranging from 5 mbar to 20 bar, preferably from 5 mbar to 2 bar.

The nanodiamond particles are heated under the hydrogen comprising gas atmosphere from 1 to 15 hours, preferably from 2 to 10 hours, and more preferably from 3 to 9 hours.

The nanodiamond particles are heated under the hydrogen comprising gas atmosphere at a temperature from 300 to 1000° C., preferably from 400 to 900° C., and more preferably from 400 to 850° C.

The zeta positive hydrogenated nanodiamond powder obtained by the heating the nanodiamond particles under the gas atmosphere are initially in agglomerated powder form. If the agglomerated powder is subjected to one hour ultrasonic treatment, for example with Hielscher 400 W ultrasonic device, in water, average particle size distribution (D50) of the zeta positive hydrogenated nanodiamond particles in the agglomerated form is from 2 nm to 400 nm, preferably from 2 nm to 100 nm. For conducting said particle size distribution measurement, reliable and reproducible results can be received with nanodiamond concentrations varying between 0.1 to 1.5 wt-%.

As suspended into water, zeta potential of the obtained zeta positive hydrogenated nanodiamond particles is over +30 mV, preferably over +40 mV, more preferably over +50 mV, and most preferably over +60 mV, measured at pH higher than 7.

As suspended into water, zeta potential of the obtained zeta positive hydrogenated nanodiamond particles is over +30 mV at a pH-range from 1.5 to 13, preferably at a pH-range from 2 to 11, and more preferably at a pH-range from 2 to 10.

In a second aspect of the present invention there is provided a method for producing zeta positive single digit hydrogenated nanodiamond dispersions.

More particularly, there is provided a method for producing zeta positive single digit hydrogenated nanodiamond dispersion, the method comprising i) heating nanodiamond particles under a gas atmosphere comprising hydrogen gas at substantially ambient pressure for producing zeta positive hydrogenated nanodiamond powder, wherein hydrogen gas content in the gas atmosphere is 1-10%;

ii) suspending the zeta positive hydrogenated nanodiamond powder into a liquid medium; and iii) subjecting the zeta positive hydrogenated nanodiamond suspension to beads assisted sonic disintergration (BASD) process.

In step i) nanodiamond particles are heated under a gas atmosphere at substantially ambient pressure for producing zeta positive hydrogenated nanodiamond powder, wherein the gas atmosphere comprises hydrogen gas.

The precursor nanodiamond particles may be essentially pure nanodiamond particles, preferably having a nanodiamond content of at least 87% by weight, more preferably at least 97% by weight. The nanodiamond particles may contain graphite and amorphous carbon originating from the production of the nanodiamonds. They may also contain some residual metal impurities, either as metals or in metal oxide form. The nanodiamond particles used as precursors for the hydrogenated nanodiamonds are commercially available.

The gas atmosphere comprises hydrogen gas. In order to avoid interferences during the heating process of the nanodiamond particles under the gas atmosphere by foreign substances preferably hydrogen gas is used with purity of at least 99.9%, more preferably at least, 99.999%. The hydrogen gas may be cleaned prior to introduction into the reaction chamber, for example, by via a palladium membrane. Hydrogen gas may be fed periodically or continuously into the reaction chamber. Hydrogen gas is commercially available.

In a preferred embodiment the gas atmosphere comprises additionally one or more inert gases. The inert gas can be any gas that is not chemically reactive. That is, the inert gas can be any gas that is not chemically reactive in the method of the present invention. Preferably the inert gas is selected from the group consisting of argon, nitrogen, helium, or a mixture thereof. Most preferably the inert gas is argon.

Preferably the heating of the nanodiamond particles under the gas atmosphere occurs in a reaction chamber with hydrogen gas and one or more inert gases being continuously guided through the reaction chamber during the heating.

Hydrogen gas and one or more inert gases are guided continuously, as a mixture, through the reaction chamber with flow rate from 0.01 to 50 slpm (standard liter per minute), preferably from 0.1 to 15 slpm, and more preferably from 0.1 to 10 slpm.

Hydrogen gas content in the gas mixture guided through a reaction chamber is 1-10%, preferably 2-8%, and more preferably 3-7%. The hydrogen gas content relates to hydrogen content in reactive gas flow. The percentage relates here to the percentage of particles.

The reaction chamber may be any suitable reactor, known by a skilled person, which can be used in the present invention. The reaction chamber may be for example a suitable furnace.

The heating of the nanodiamond particles under the hydrogen comprising gas atmosphere occurs substantially at ambient pressure. In one embodiment the heating occurs at a pressure ranging from 5 mbar to 20 bar, preferably from 5 mbar to 2 bar.

The nanodiamond particles are heated under the hydrogen comprising gas atmosphere from 1 to 15 hours, preferably from 2 to 10 hours, and more preferably from 3 to 9 hours.

The nanodiamond particles are heated under the hydrogen comprising gas atmosphere at a temperature from 300 to 1000° C., preferably from 400 to 900° C., and more preferably from 400 to 850° C.

The zeta positive hydrogenated nanodiamond powder obtained by the heating the nanodiamond particles under the gas atmosphere are initially in agglomerated powder form.

In step ii) the obtained zeta positive hydrogenated nanodiamond powder is suspended into a liquid medium.

Any known suitable methods and devices may be used for suspending the zeta positive hydrogenated nanodiamond powder into a liquid medium. Examples of such methods are magnetic stirring, ultrasound, combined magnetic stirring and ultrasound treatment, magnetic stirring followed by ultrasound treatment, or magnetic stirring followed by ultrasound treatment followed by magnetic stirring.

The zeta positive hydrogenated nanodiamond particles may be in the suspension in agglomerated form, or as a mixture of agglomerated and single digit form. Particle size distribution of the agglomerated suspension form is between 2 nm to 400 nm, preferably between 2 nm and 100 nm.

The liquid medium may be any suitable liquid medium. The liquid medium is preferably selected from the group consisting of polar protic solvents, polar aprotic solvents, dipolar aprotic solvents, aromatic solvents, chlorinated solvents, ionic liquids, or a mixture of any said mediums.

Preferred polar protic solvents are water; alcohols such as methanol, ethanol, iso-propanol, butanol, linear aliphatic diols such as ethylene glycol, 1,3-propanediol, 1,4-butanediol, 1,5-pentanediol, 1,8-octanediol; branched diols such as 1,2-propanediol, 1,3-butanediol, 2,3-butanediol, 1,3-butanediol, 1,2-pentanediol, etohexadiol, p-menthane-3,8-diol, 2-methyl-2,4-pentanediol; and carboxylic acids such as formic acid and acetic acid.

Preferred polar aprotic solvents are tetrahydrofuran, propylene carbonate and lactams such as N-methyl-2-pyrrolidone (NMP) and N-ethyl-2-pyrrolidone (NEP).

Preferred dipolar aprotic solvents are ketones such as acetone and methyl ethyl ketone (MEK); esters such as methyl acetate, ethyl acetate; N,N-methylformamide and dimethyl sulfoxide (DMSO).

Preferred aromatic solvents are toluene, xylenes and benzene.

Preferred chlorinated solvents are dichloromethane, trichloroethylene and chloroform.

Preferred ionic liquids are 1-ethyl-3-methylmidazolium chloride, 1-butyl-3-methylmidazolium chloride, 1-ethyl-3-methyl-imidazolium ethylsulfate, 1-ethyl-3-methyl imidazolium diethylphosphate, 1-ethyl-3-methyl-imidazolium dicyanamide, Tris-(2-hydroxyethyl)-methylammonium methylsulfate, 1-ethyl-3-methylimidazolium thiocyanate, 1-ethyl-3-methyl-imidazolium tetrafluoroborate, 1-ethyl-3-methyl-imidazolium trifluoromethanesulfonate, 1-ethyl-3-methyl-imidazolium bis(trifluoromethanesulfonyl)imide, 1-ethyl-3-methyl-imidazolium methylcarbonate and 1-butyl-3-methyl-imidazolium methylcarbonate, The most preferred ionic liquids are 1-ethyl-3-methylmidazolium chloride and 1-butyl-3-methylmidazolium chloride.

Preferably the liquid medium is selected from the group consisting of water, methanol, ethanol, iso-propanol, linear aliphatic diols, branched diols, N-methyl-2-pyrrolidone (NMP), N-ethyl-2-pyrrolidone (NEP) and dimethyl sulfoxide (DMSO), or a mixture of any said solvents. More preferably the solvent is selected from the group consisting of water, NMP, NEP, γ-butyrolactone and ethylene glycol, or a mixture of any said solvents. Even more preferably the solvent is selected from the group consisting of water, NMP, NEP and γ-butyrolactone, or a mixture of any said solvents.

Most preferably the liquid medium is water. The water may be deionized.

The zeta positive hydrogenated nanodiamond powder can be suspended directly into water or other liquid mediums. Alternatively, the zeta positive hydrogenated nanodiamond powder can be first suspended into water, then mixing another liquid medium, having boiling point above water and at least partly soluble in water, with the aqueous zeta positive hydrogenated nanodiamond suspension, and then distilling (evaporating) the water out, giving zeta positive hydrogenated nanodiamond particles suspended in the liquid medium other than water.

In step iii), the zeta positive hydrogenated nanodiamond suspension is subjected to beads assisted sonic disintergration (BASD) process for obtaining the zeta positive single digit hydrogenated nanodiamond dispersion.

The BASD process means combined beads milling and ultrasonication processes. That is, the zeta positive hydrogenated nanodiamond suspension is simultaneously beads milled and treated with ultrasonication The beads mill devices and the ultrasonic devices, and the BASD process are known for a skilled person. The beads assisted sonic disintergration process can be operated with pass or re-circulation method. In the pass method the material is fed to the apparatus at one end and discharged at the other end. In the re-circulation method the material circulates in the system until required particle size is obtained. The smaller the grinding media particles are, the smaller is the particle size of the final product. A grinding chamber of the apparatus can also be filled with an inert shield gas, such as nitrogen, that does not react with the material being ground, to prevent oxidation or explosive reactions that could occur with ambient air inside the mill. The ultrasonication can be kept on during the whole milling or switched off at any stage, and optionally switched on again. The BASD process is run until a suitable particle size is obtained. The apparatuses for the beads assisted sonic disintergration are commercially available.

The obtained zeta positive hydrogenated nanodiamond particles in the dispersion are substantially in a single digit form.

In an embodiment of the present invention, after the BASD process obtained aqueous zeta positive single digit hydrogenated nanodiamond dispersion is further treated. Liquid medium other than water having boiling point above water and at least partly soluble in water, is mixed with the aqueous zeta positive single digit hydrogenated nanodiamond dispersion, following distillation of water, giving zeta positive single digit hydrogenated nanodiamond particles dispersed in the liquid medium other than water.

Zeta potential of the zeta positive single digit hydrogenated nanodiamond dispersion is over +35 mV, preferably over +40 mV, and most preferably over +50 mV measured at pH higher than 7.

Zeta potential of the zeta positive single digit hydrogenated nanodiamond dispersion is over +50 mV, preferably over +60 mV measured at pH lower than or 7.

The zeta positive single digit hydrogenated nanodiamond dispersion is stable when the zeta potential is over +35 mV measured at pH higher than 7.

D90 average particle size distribution of the zeta positive single digit hydrogenated nanodiamond dispersion is from 2 nm to 30 nm, preferably from 2 nm to 20 nm, more preferably from 2 to 14 nm, and most preferably from 3 nm to 12 nm.

The zeta positive single digit hydrogenated nanodiamond particle concentration in the dispersion is at least 0.2 wt-%, preferably between 0.2 and 10 wt-%, and more preferably between 0.5 and 8 wt-%.

pH of the zeta positive single digit hydrogenated nanodiamond dispersion may be basic, neutral or acidic. Preferably the pH is from 1.5 to 13, more preferably from 1.5 to 12, and most preferably from 2 to 10.

In a third aspect of the present invention there is provided zeta positive hydrogenated nanodiamond powder.

More particularly there is provided zeta positive hydrogenated nanodiamond powder comprising zeta positive hydrogenated nanodiamond particles, wherein
i) zeta potential of the zeta positive hydrogenated nanodiamond particles as suspended in water is over +30 mV measured at pH higher than 7,
ii) D50 average particle size distribution of the zeta positive hydrogenated nanodiamond particles in the agglomerated form is from 2 nm to 400 nm, preferably from 2 nm to 100 nm when subjected to one hour ultrasonic treatment in water.

Preferably the zeta potential of the zeta positive hydrogenated nanodiamond particles, as suspended in water, is over +40 mV, more preferably over +50 mV, and most preferably over +60 mV measured at pH higher than 7.

As suspended in water, zeta potential of the obtained zeta positive hydrogenated nanodiamond particles is over +30 mV at a pH-range from 1.5 to 13, preferably at a pH-range from 2 to 11, and more preferably at a pH-range from 2 to 10.

In a fourth aspect of the present invention there is provided a zeta positive single digit hydrogenated nanodiamond dispersion comprising zeta positive single digit hydrogenated nanodiamond particles and a liquid medium.

More particularly there is provided zeta positive single digit hydrogenated nanodiamond dispersion comprising zeta positive single digit hydrogenated nanodiamond particles and a liquid medium, wherein
i) zeta potential of the zeta positive single digit hydrogenated nanodiamond dispersion is over +30 mV measured at pH higher than 7,
ii) D90 average particle size distribution of the zeta positive single digit hydrogenated nanodiamond particles in the dispersion is from 2 nm to 12 nm.

The liquid medium may be any suitable liquid medium. The liquid medium is preferably selected from the group consisting of polar protic solvents, polar aprotic solvents, dipolar aprotic solvents, aromatic solvents, chlorinated solvents, ionic liquids, or a mixture of any said mediums.

Preferred polar protic solvents are water; alcohols such as methanol, ethanol, iso-propanol, butanol, linear aliphatic diols such as ethylene glycol, 1,3-propanediol, 1,4-butanediol, 1,5-pentanediol, 1,8-octanediol; branched diols such as 1,2-propanediol, 1,3-butanediol, 2,3-butanediol, 1,3-butanediol, 1,2-pentanediol, etohexadiol, p-menthane-3,8-diol, 2-methyl-2,4-pentanediol; and carboxylic acids such as formic acid and acetic acid.

Preferred polar aprotic solvents are tetrahydrofuran, propylene carbonate and lactams such as N-methyl-2-pyrrolidone (NMP) and N-ethyl-2-pyrrolidone (NEP).

Preferred dipolar aprotic solvents are ketones such as acetone and methyl ethyl ketone (MEK); esters such as methyl acetate, ethyl acetate; N,N-methylformamide and dimethyl sulfoxide (DMSO).

Preferred aromatic solvents are toluene, xylenes and benzene.

Preferred chlorinated solvents are dichloromethane, trichloroethylene and chloroform.

Preferred ionic liquids are 1-ethyl-3-methylmidazolium chloride, 1-butyl-3-methylmidazolium chloride, 1-ethyl-3-methyl-imidazolium ethylsulfate, 1-ethyl-3-methyl imidazolium diethylphosphate, 1-ethyl-3-methyl-imidazolium dicyanamide, Tris-(2-hydroxyethyl)-methylammonium methylsulfate, 1-ethyl-3-methyl-imidazolium thiocyanate, 1-ethyl-3-methyl-imidazolium tetrafluoroborate, 1-ethyl-3-methyl-imidazolium trifluoromethanesulfonate, 1-ethyl-3-methyl-imidazolium bis(trifluoromethanesulfonyl)imide, 1-ethyl-3-methyl-imidazolium methylcarbonate and 1-butyl-3-methyl-imidazolium methylcarbonate, The most preferred ionic liquids are 1-ethyl-3-methylmidazolium chloride and 1-butyl-3-methylmidazolium chloride.

Preferably the liquid medium is selected from the group consisting of water, methanol, ethanol, iso-propanol, linear aliphatic diols, branched diols, N-methyl-2-pyrrolidone (NMP), N-ethyl-2-pyrrolidone (NEP) and dimethyl sulfoxide (DMSO), or a mixture of any said solvents. More preferably the solvent is selected from the group consisting of water, NMP, NEP, γ-butyrolactone and ethylene glycol, or a mixture of any said solvents. Even more preferably the solvent is selected from the group consisting of water, NMP, NEP and γ-butyrolactone, or a mixture of any said solvents.

Most preferably the liquid medium is water. The water may be deionized.

Preferably the zeta potential of the zeta positive single digit hydrogenated nanodiamond dispersion is over +40 mV, more preferably over +50 mV, and most preferably over +60 mV measured at pH higher than 7.

In an embodiment the zeta potential of the zeta positive single digit hydrogenated nanodiamond dispersion is over +60 mV, and preferably over +70 mV measured at pH lower than or 7.

Concentration of the zeta negative single digit carboxylated nanodiamond particles in the dispersion is at least 0.2 wt %, preferably between 0.2 and 10 wt %, and more preferably between 0.5 and 8 wt-%.

D90 average particle size distribution of the zeta positive single digit hydrogenated nanodiamond particles is preferably from 3 nm to 12 nm.

pH of the zeta positive single digit hydrogenated nanodiamond dispersion may be basic, neutral or acidic. Preferably the pH is from 1.5 to 13, more preferably from 1.5 to 12, and most preferably from 2 to 10.

In the following the invention will be described in more detail by means of examples. The purpose of the examples is not to restrict the scope of the claims.

EXAMPLES

The following examples are according to the present invention.

Apparatuses and Materials

Ultrasonic device: Hielscher UP400S (from company Hielscher).

Beads mill device: Bühler PML2 (from company Bühler GmbH, Germany).

Particle size and zeta potential measurement tool: Malvern Zetasizer NanoZS.

The product zeta potential values were measured of samples diluted to 0.1 wt-%. The product particle size distributions were measured of samples diluted to 0.5 wt-%.

Furnace (reaction chamber):
6-zone horizontal tubular furnace (6zHTF):
4 crucibles, 100 ml loading in each, 99.7% $Al_2O_3$
Gas change in single step—for the first very careful pumping vacuum down to $10^{-1}$ mbar and then introducing gas,
During treatment gas flow was 200 ml/min.

Nanodiamond powders:
uDiamond® Molto nanodiamond powder (commercially available from company Carbodeon), referred as nanodiamond powder A.
Nanodiamond powder from Heyuan ZhongLian Nanotechnology Co., Ltd, referred as nanodiamond powder B.

Solvents:
N-Methyl-2-pyrrolidone (NMP), Assay ≥99.5%, was purchased from VWR Chemicals/Prolabo, Assay ≥99.5%.
1-Ethyl-2-pyrrolidone (NEP), Assay 98%, was purchased from AppliChem Panreac.
γ-Butyrolactone (GBL), Assay ≥99%, was purchased from Sigma Aldrich.

Ethylene glycol (EG), Normapur, Assay ≥99.9%, was purchased from VWR Prolabo.

The solvent based nanodiamond dispersion moisture contents were determined by Karl Fischer method at Ketek Oy, Finland.

The EDX analyses were carried out with Zeiss Ultra Plus Gemine tool. The applied acceleration voltage was 20 kV.

The XRD patterns were recorded between angles 5-45° (2Theta) by using Philips Powder X-Ray Diffractometer by using MoKα-radiation (Kα 0.70932 Å) with fixed divergence slit (size 0.8059°), but without incident beam monochromator. Power of radiation was 1757 W. The analyses were conducted by VTT, Finland.

Nanodiamond Hydrogenation

Hydrogenation at 500° C.

Figure 1:
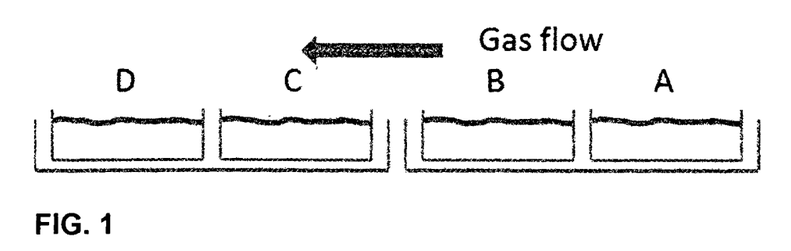
FIG. 1 shows sample (samples A, B, C and D) positions and gas flow direction in a furnace according to the present invention.

16.63 g (sample A), 17.59 g (sample B), 17.63 g (sample C) and 17.58 g (sample D) of nanodiamond powder A were loaded on alumina crucibles as shown FIG. 1. Gas change was conducted in single step, for the first very careful pumping vacuum down to $10^{-1}$ mbar and then introducing 4% hydrogen gas (purity of hydrogen gas 99.9999%) in argon. The hydrogen containing argon gas flow was adjusted to 200 ml/min.

Figure 2:
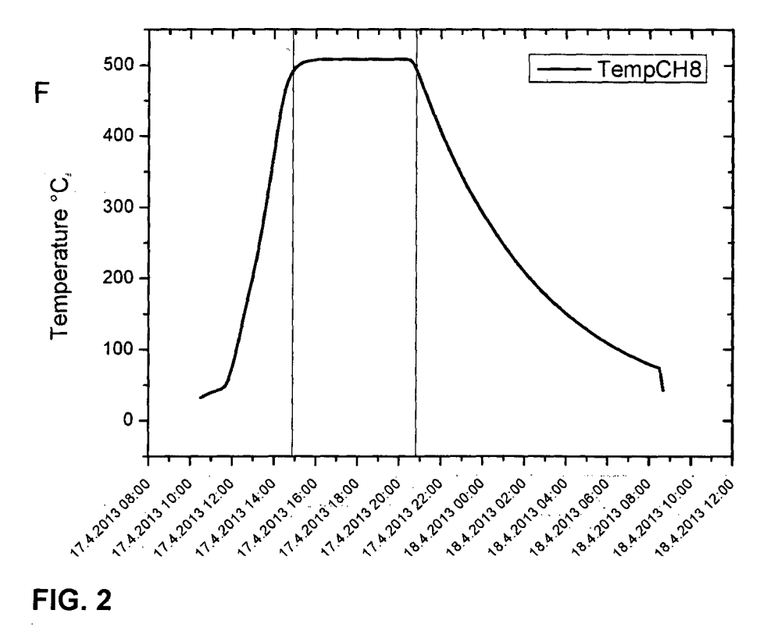
FIG. 2 shows the temperature plot for nanodiamond hydrogenation process conducted at 500° C. for 6 hours' time according to the present invention.
Figure 3A:
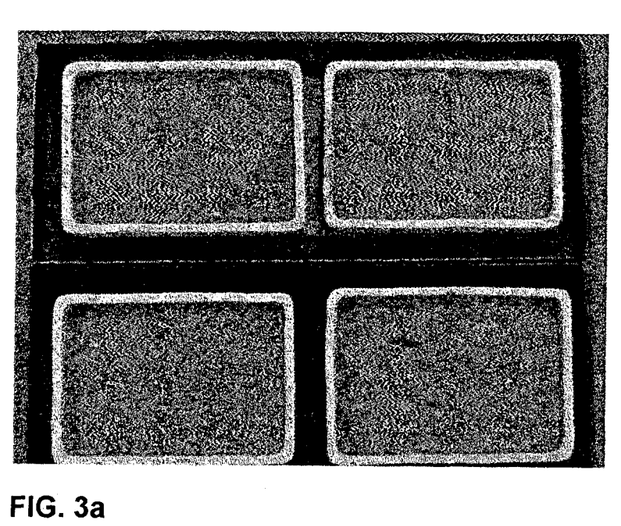
FIG. 3a shows untreated nanodiamond powder B samples.
Figure 3B:
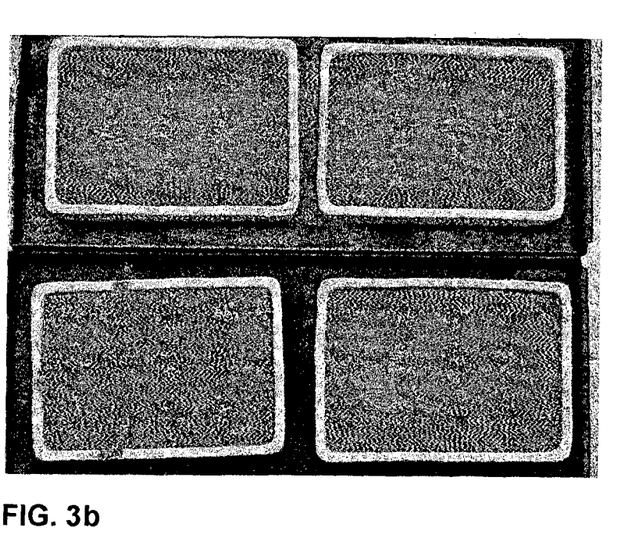
FIG. 3b shows hydrogenated nanodiamond B samples according to the present invention.

As reaching treatment temperature of 500° C., the samples were kept under said gas flow for 6 hours time, followed by gradual cooling of reaction furnace into room temperature, within 14 hours time. The treatment temperature plot is depicted in FIG. 2. The resulting hydrogenated nanodiamond powder exhibits paler colour than untreated nanodiamond powder A. The untreated and hydrogenated samples are shown in FIGS. 3a and 3b. The powder was collected and weighted and the yield was measured to 97.4%.

A 0.5 g sample of hydrogenated nanodiamond powder was mixed into 100 ml of deionized water, and the resulting mixture was subjected to ultrasonic treatment for one hour time. The resulting suspension D50 particle size distribution was measured to 302 nm, and zeta potential to +52.0 mV.

Hydrogenation at 520° C.

25.68 g of nanodiamond powder A and 23.74 g of nanodiamond powder B were loaded on two alumina crucibles. Gas change was conducted in single step, for the first very careful pumping vacuum down to $10^{-1}$ mbar and then introducing 4% hydrogen gas (purity of hydrogen gas 99.9999%) in argon. The hydrogen containing argon gas flow was adjusted to 200 ml/min. As reaching treatment temperature of 520° C., the samples were kept under said gas flow for 6 hours time, followed by gradual cooling of reaction furnace into room temperature, within 14 hours time. Also here, the resulting hydrogenated nanodiamond powders exhibits paler colour than untreated nanodiamond powders. The powders were collected and weighted and the yield was measured to 95.8% for nanodiamond powder A and 93.4 for nanodiamond powder B.

A 0.5 g sample of hydrogenated nanodiamond B powder was mixed into 100 ml of deionized water, and the resulting mixture was subjected to ultrasonic treatment for one hour time. The resulting suspension zeta potential was measured to +68.4 mV.

Hydrogenation at 600° C.

20.00 g, 20.00 g, 20.00 g and 20.00 g of nanodiamond powder B were loaded on alumina crucibles. Gas change was conducted in single step, for the first very careful pumping vacuum down to $10^{-1}$ mbar and then introducing 4% hydrogen gas (99.9999%) in argon. The hydrogen containing argon gas flow was adjusted to 200 ml/min. As reaching treatment temperature of 600° C., the samples were kept under said gas flow for 6 hours time, followed by gradual cooling of reaction furnace into room temperature, within 14 hours time. Also here, the resulting hydrogenated nanodiamond powder exhibits paler colour than untreated nanodiamond powder B. The powders were collected and combined. The combined sample was weighted and the yield was measured to 92.2%.

The EDX analysis revealed the produced hydrogen terminated nanodiamond powder is essentially free of nitrogen contained surface functions.

The XRD analysis revealed there is hardly any graphitic carbon present in produced hydrogenated nanodiamond powder. The area ratio for Graf. (002)/Diam. (111) for the produced hydrogenated nanodiamond powder was determined to be 0.01 whilst it was 0.09 for the applied starting material nanodiamond powder. The nanodiamond crystal size (111) was measured to be 31-33 Å.

Figure 4:
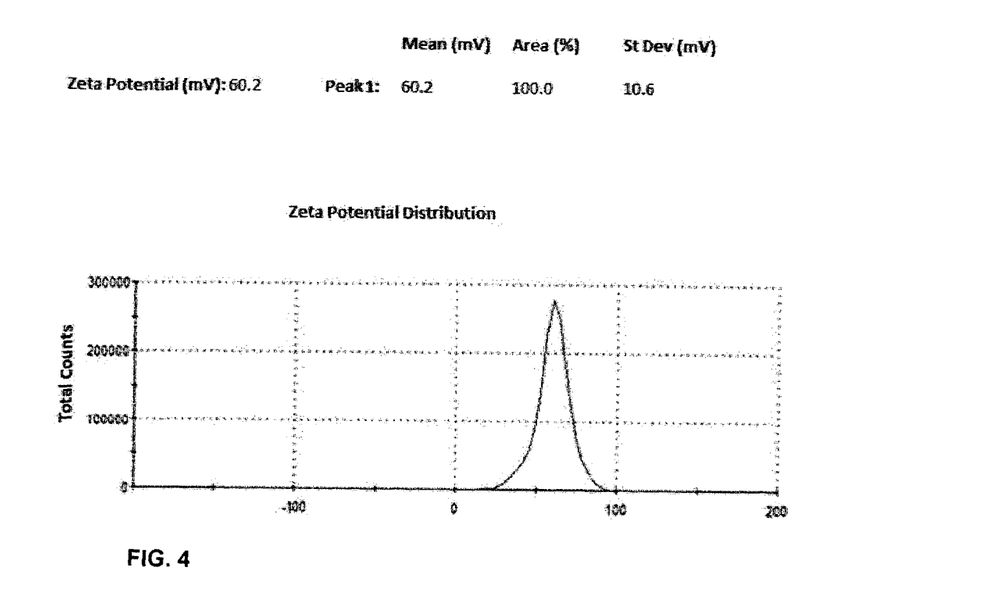
FIG. 4 shows zeta potential of hydrogenated nanodiamond B powder according to the present invention made at 600° C. for 6 hours' time, after subjecting said sample for ultrasonic treatment in water for one hour time.

A 0.5 g sample of hydrogenated dispersion was mixed into 100 ml of deionized water, and the resulting mixture was subjected to ultrasonic treatment for one hour time. The resulting suspension zeta potential was measured to +60.2 mV. The sample zeta potential curve is shown in FIG. 4.

Beads Assisted Sonic Disintergration of Hydrogenated Nanodiamond B Powder Sample (Hydrogenated at 600° C.)

312.5 g of deionized water and 7.5 g of zeta positive hydrogenated nanodiamond powder B were mixed with a conventional magnetic stirrer to form a nanodiamond suspension. The suspension was subjected to ultrasonic treatment for 30 minutes, using H14 blade and 40% amplitude. The suspension was stirred with conventional magnetic stirrer (100 rpm), with simultaneous cooling with an ice-bath.

Figure 5:
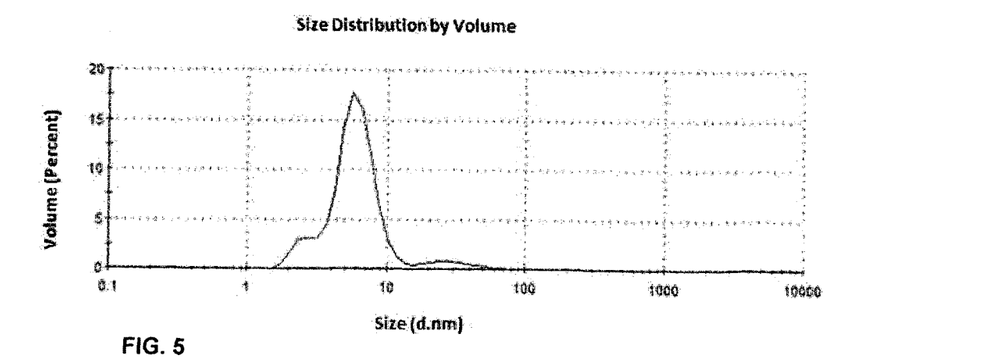
FIG. 5 shows particle size distribution of single digit hydrogenated nanodiamond dispersion after beads assisted sonic disintergration process (BASD) according to the present invention.

Said suspension was then subjected to beads assisted sonic disintergration, using 30 micron zirconia beads. The milling speed was adjusted to 3700 rpm, and after 20 minutes treatment time, the ultrasonic power was lowered to cycle 0.7 from 0.5. The rotation pump speed was maintained at 10% throughout the two hours processing time. As the mill had been pre-filled with 180 ml of water, a total volume of 500 ml of 1.5 wt-% highly zeta positive hydrogenated nanodiamond dispersion was collected. The dispersion pH was measured to 6.4 and the zeta potential to +61.2 mV. The particle size distribution was the following: D10 3.16 nm; D50 5.81 nm; and D90 9.78 nm (FIG. 5).

Figure 8:
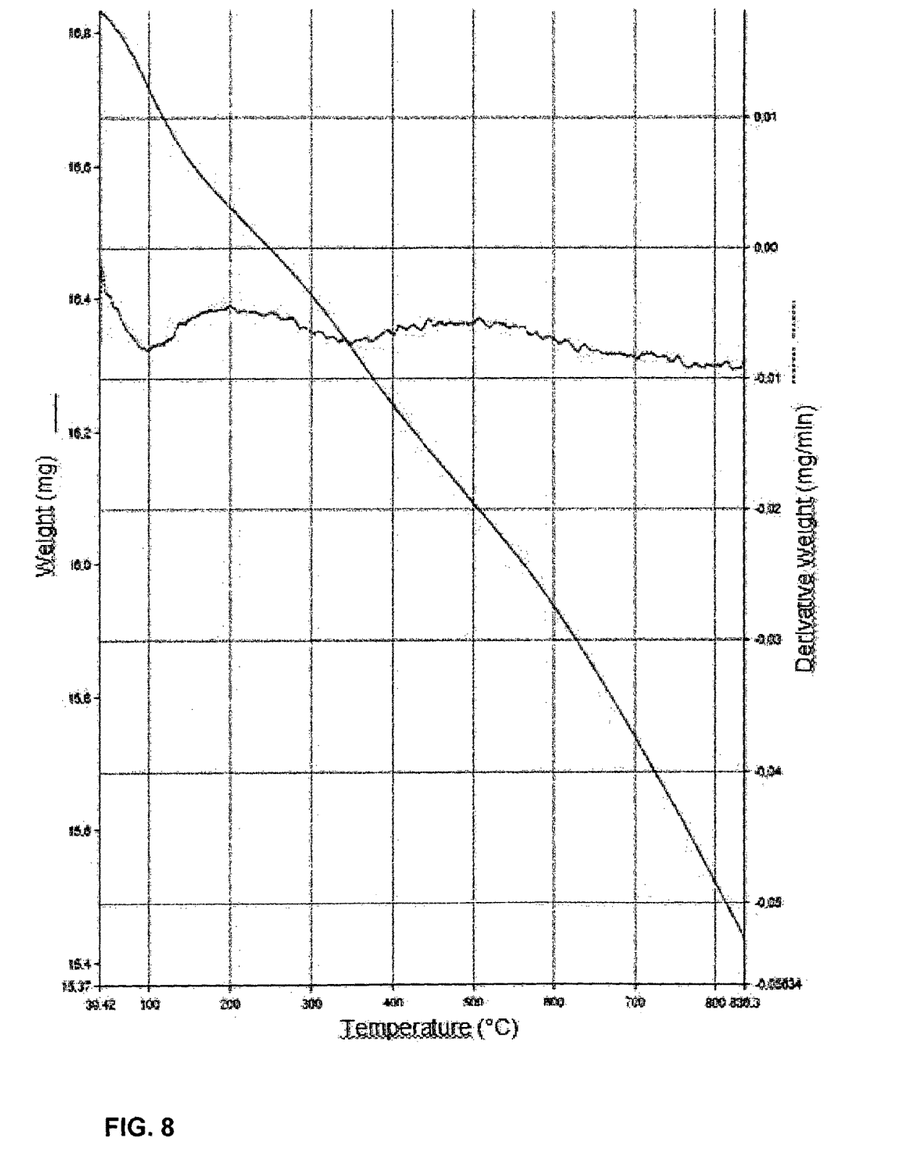
FIG. 8 shows thermogravimetric analysis curve of dried hydrogenated nanodiamond dispersion according to the present invention.

The produced hydrogenated nanodiamond dispersion was dried and subjected to thermogravimetric analysis (TGA). Almost linear TGA curve after 100° C. (after water vaporization) indicates very stable oxidation of nanodiamond material and thus, indicating very low surface nitrogen and oxygen levels. The dried hydrogenated nanodiamond dispersion TGA curve is depicted in FIG. 8.

Highly Zeta Positive Single Digit Aqueous Nanodiamond Dispersion Zeta Potential Stability and Tunability within pH Range of 1.4 to 12.1

Nanodiamond powder B was subjected to 6 hours hydrogenation at 600° C., followed by beads assisted sonic disintergration into 1.5 wt-% single digit hydrogenated nanodiamond dispersion. In Table 1 are disclosed measured zeta potentials of single digit hydrogenated nanodiamond dispersion at pH range from 1.4 to 12.1. pH of the dispersion was controlled with either HCl or NaH$_4$OH and treated with sonication for 30 min. The zeta potentials were measured from diluted 0.1 wt-% nanodiamond samples. This zeta positive single digit hydrogenated nanodiamond dispersion sample was dispersion stable within pH range from 3 to 9.6, and retained of zeta potential of +30 mV or higher within pH range of 1.9 to 9.8.

TABLE 1

Zeta potentials of single digit hydrogenated nanodiamond dispersion.

| pH | zeta potential (mV) |
|---|---|
| 1.4 | 27.0 |
| 2.2 | 48.6 |
| 3.1 | 47.7 |
| 4.1 | 50.9 |
| 5.0 | 56.4 |
| 6.1 | 57.6 |
| 7.4 | 50.0 |
| 8.9 | 42.3 |
| 9.3 | 35.0 |
| 9.6 | 30.9 |
| 11.0 | 9.4 |
| 11.8 | 10.4 |
| 12.1 | 11.9 |

Figure 6:
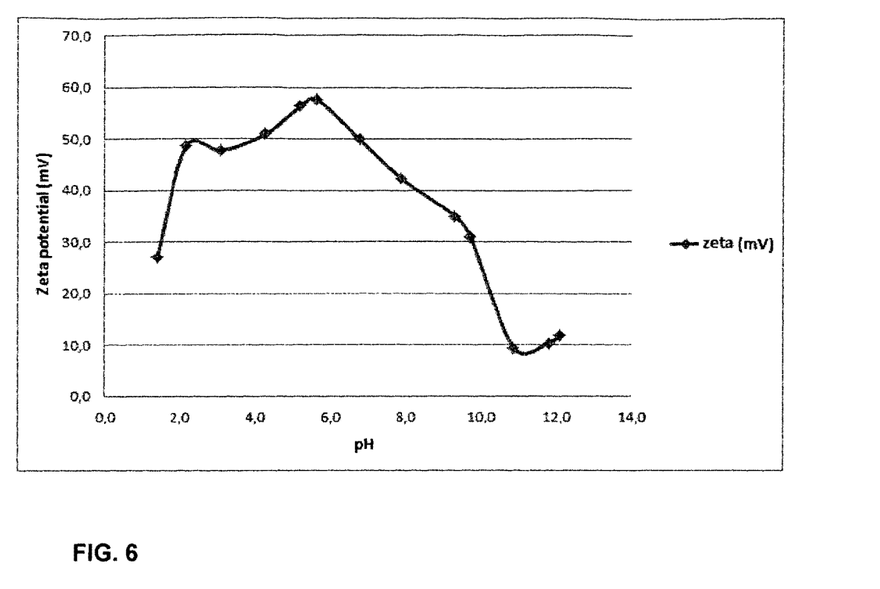
FIG. 6 shows dispersion stability of single digit hydrogenated nanodiamond dispersion according to present invention.

The dispersion stability of pH adjusted hydrogenated nanodiamond dispersion samples within pH range of 1.4 to 12.1 is featured in FIG. 6.

Beads Assisted Sonic Disintergration of Hydrogenated Nanodiamond B Powder Sample (Hydrogenated at 500° C.)

312.5 g of deionized water and 17.5 g of zeta positive hydrogenated nanodiamond powder B were mixed with a conventional magnetic stirrer to form a nanodiamond suspension. The suspension was subjected to ultrasonic treatment for 30 minutes, using H14 blade and 40% amplitude. The suspension was stirred with conventional magnetic stirrer (100 rpm), with simultaneous cooling with an ice-bath.

Figure 7:
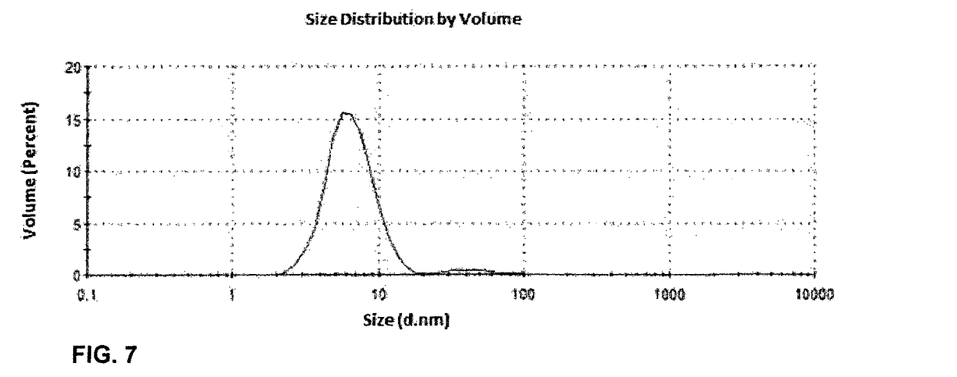
FIG. 7 shows particle size distribution of single digit hydrogenated nanodiamond dispersion after beads assisted sonic disintergration process according to the present invention.

Said suspension was then subjected to beads assisted sonic disintergration, using 30 micron zirconia beads. The milling speed was adjusted to 3700 rpm, and after 20 minutes treatment time, the ultrasonic power was lowered to cycle 0.7 from 0.5. The rotation pump speed was maintained at 10% throughout the two hours processing time. As the mill had been pre-filled with 180 ml of water, a total volume of 500 ml of 3.5 wt-% highly zeta positive hydrogenated nanodiamond dispersion was collected. The dispersion pH was measured to 6.6 and the zeta potential to +54.6 mV. The particle size distribution was the following: D10 3.97 nm; D50 6.33 nm; and D90 10.9 nm (FIG. 7).

Preparation of Highly Zeta Positive 3.0 wt. % Single Digit Hydrogenated Nanodiamond Dispersion in NMP The evaporator water bath was preheated up to 45° C. 36.5 g of 2.74 wt. % aqueous highly zeta positive, hydrogen functionalized nanodiamond dispersion was weighted into 250 ml round bottomed flask, followed by addition of 33 g of NMP solvent. The resulting mixture was stirrer vigorously for 5 minutes time. Then, the mixture was evaporated in the following sequences: 1000 mbar down to 200 mbar (in three minutes), down to 100 mbar during additional one minute evaporation, down to 50 mbar in still another minute of evaporation, and to less than 15 mbar by 10 minute total evaporation time. Said steps were carried out without placing the flask into evaporator water bath. Thereafter, evaporation was continued by placing the flask into water bath (T=45° C.), rising the water bath temperature during 10 minutes to 60° C. Then, the evaporation was continued until reaching the total evaporation time of 29 minutes.

The resulting dispersion was weighted to 33.2 g. Resulting dispersion water content was measured to 1.46 wt. % by Karl Fischer titration. The oven dried nanodiamond sample weighted 1.0 g, revealing that produced NMP based nanodiamond dispersion nanodiamond concentration is 3.0 wt. %

Figure 9:
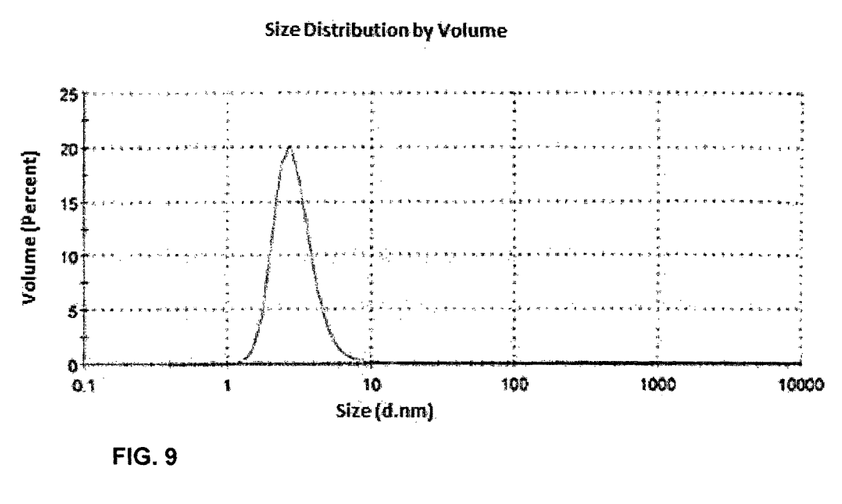
FIG. 9 shows particle size distribution of single digit hydrogenated nanodiamond dispersion according to the present invention.

The dispersion exhibited the following particle size distribution: D10: 1.94 nm; D50: 2.78 nm; D90: 4.38 nm. The dispersion zeta potential was measured to +40.7 mV. The particle size distribution of prepared hydrogen functionalized nanodiamond dispersion is illustrated in FIG. 9.

It was also possible to prepare 4.2 wt. % hydrogen functionalized nanodiamond dispersion in NMP, with the following particle size distribution: D10: 1.80 nm; D50: 2.64 nm and D90: 4.37 nm. After cooling down such a dispersion viscosity is increased as compared to 3 wt. % hydrogen functionalized nanodiamond dispersion.

Preparation of Highly Zeta Positive 2.0 wt. % Single Digit Hydrogenated Nanodiamond Dispersion in NEP The evaporator water bath was preheated up to 45° C. 42.0 g of 2.38 wt. % aqueous highly zeta positive, hydrogen functionalized nanodiamond dispersion was weighted into 250 ml round bottomed flask, followed by addition of 50 g of NEP solvent. The resulting mixture was stirrer vigorously for 5 minutes time. Then, the mixture was evaporated in the following sequences: 1000 mbar down to 200 mbar (in three minutes), down to 100 mbar during additional one minute evaporation, down to 50 mbar in still another minute of evaporation, and to less than 15 mbar by 10 minute total evaporation time. Said steps were carried out without placing the flask into evaporator water bath. Thereafter, evaporation was continued by placing the flask into water bath (T=45° C.), rising the water bath temperature during 10 minutes to 60° C. Thereafter, evaporation was continued for additional 5 minutes at said temperature.

The resulting dispersion was weighted to 50.0 g. Resulting dispersion water content was measured to 1.18 wt. % by Karl Fischer titration. The oven dried nanodiamond sample weighted 1.0 g, revealing that produced NEP based nanodiamond dispersion nanodiamond concentration is 2.0 wt. %

Figure 10:
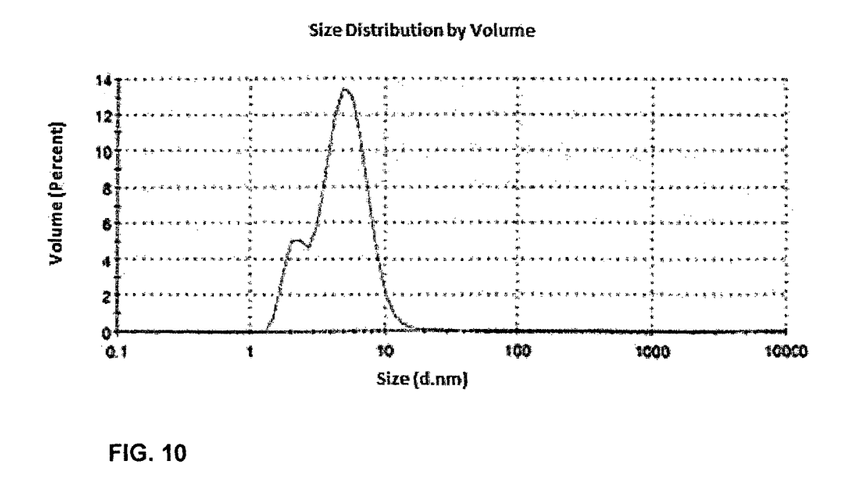
FIG. 10 shows particle size distribution of 2.0 wt. % single digit hydrogenated nanodiamond dispersion according to the present invention.

The prepared dispersion exhibited the following particle size distribution: D10: 2.21 nm; D50: 4.71 nm and D90: 8.21 nm. The particle size distribution curve is illustrated in FIG. 10. The dispersion zeta potential was measured to 55.1 mV.

Preparation of Highly Zeta Positive 3.1 wt. % Single Digit Hydrogenated Nanodiamond Dispersion in Gamma-Butyrolactone (GBL)

The evaporator water bath was preheated up to 45° C. 36.5 g of 2.74 wt. % aqueous highly zeta positive, hydrogen functionalized nanodiamond dispersion was weighted into 250 ml round bottomed flask, followed by addition of 33 g of GBL solvent. The resulting mixture was stirrer vigorously for 5 minutes time. Then, the mixture was evaporated in the following sequences: 1000 mbar down to 200 mbar (in three minutes), down to 100 mbar during additional one minute evaporation, down to 50 mbar in still another minute of evaporation, and to less than 15 mbar by 10 minute total evaporation time. Said steps were carried out without placing the flask into evaporator water bath. Thereafter, evaporation was continued by placing the flask into water bath (T=45° C.), rising the water bath temperature during 7 minutes to 60° C. Then, the evaporation was continued for additional 8 minutes.

The resulting dispersion was weighted to 32.2 g. Resulting dispersion water content was measured to 0.23 wt. % by Karl Fischer titration. The oven dried nanodiamond sample weighted into 1.0 g, revealing that produced GBL based nanodiamond dispersion nanodiamond concentration is 3.1 wt. %

Figure 11:
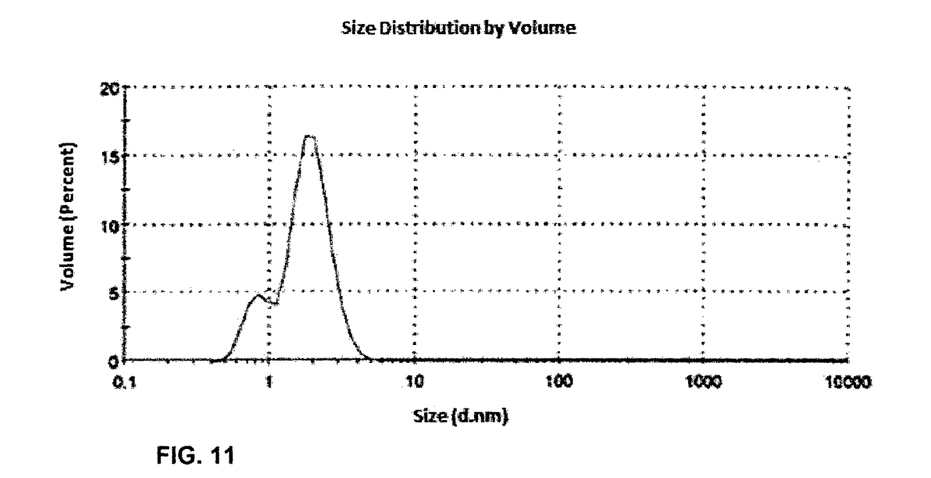
FIG. 11 shows particle size distribution of 3.1 wt. % single digit hydrogenated nanodiamond dispersion according to the present invention.

The prepared dispersion exhibited the following particle size distribution: D10: 0.844 nm; D50: 1.77 nm; D90: 2.75 nm. The particle size distribution curve is illustrated in FIG. 11. The dispersion zeta potential was measured to 61.8 mV.

It was also possible to prepare 4.1 wt. % hydrogen functionalized nanodiamond dispersion in GBL, with the following particle size distribution: D10: 1.16 nm; D50: 1.82 nm and D90: 2.75 nm. Further, if was possible to prepare a 5.0 wt. % hydrogen functionalized nanodiamond dispersion in GBL, with the following particle size distribution: D10: 1.05 nm; D50: 1.65 nm and D90: 2.67 nm. After cooling down said dispersions, the 4.1 wt. % hydrogen functionalized nanodiamond dispersion exhibits slightly higher viscosity as compared to corresponding 3.1 wt. % dispersion, the 5.0 wt. % dispersion being high.

Preparation of Highly Zeta Positive 3.0 wt. % Single Digit Hydrogenated Nanodiamond Dispersion in Ethylene Glycol (EG)

The evaporator water bath was preheated up to 65° C. 126.0 g of 2.38 wt. % aqueous highly zeta positive, hydrogen functionalized nanodiamond dispersion was weighted into one liter round bottomed flask, followed by addition of 100 g of EG solvent. The resulting mixture was stirrer vigorously for 5 minutes time. Then, the mixture was evaporated in the following sequences: 1000 mbar down to 200 mbar (in three minutes), down to 100 mbar during additional one minute evaporation, down to 60 mbar in still another minute of evaporation, and to 20 mbar by 7 minute total evaporation time. Said steps were carried out without placing the flask into evaporator water bath. Thereafter, evaporation was continued by placing the flask into water bath (T=65° C.), rising the water bath temperature during 10 minutes to 80° C. Then, the evaporation was continued for additional 7 minutes.

The resulting dispersion was weighted to 98.7 g. Resulting dispersion water content was measured to 0.71 wt. % by Karl Fischer titration. The oven dried nanodiamond sample weighted into 3.0 g, revealing that produced EG based nanodiamond dispersion nanodiamond concentration is 3.0 wt. %

Figure 12:
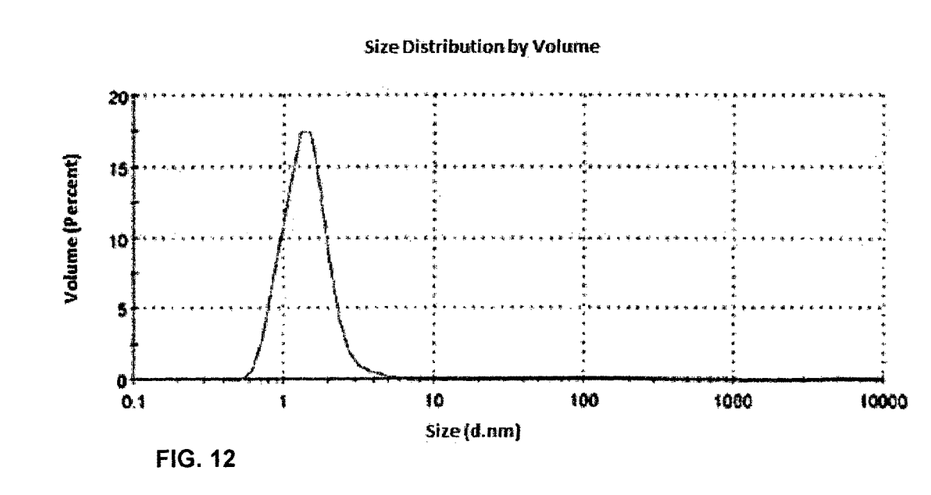
FIG. 12 shows particle size distribution of 3.0 wt. % single digit hydrogenated nanodiamond dispersion according to the present invention.

The prepared dispersion exhibited the following particle size distribution: D10: 0.749 nm; D50: 1.32 nm and D90: 2.34 nm. The particle size distribution curve is illustrated in FIG. 12. It was impossible to determine the produced dispersion zeta potential value accurately, but it carried a positive charge.

Preparation of Highly Zeta Positive 5.0 wt. % Single Digit Hydrogenated Nanodiamond Dispersion in Ethylene Glycol (EG)

The evaporator water bath was preheated up to 65° C. 36.5 g of 2.74 wt. % aqueous highly zeta positive, hydrogen functionalized nanodiamond dispersion was weighted into one liter round bottomed flask, followed by addition of 20 g of EG solvent. The resulting mixture was stirrer vigorously for 5 minutes time. Then, the mixture was evaporated in the following sequences: 1000 mbar down to 200 mbar (in two minutes), down to 100 mbar during additional 1.5 minutes evaporation, down to 40 mbar in still another minute of evaporation, and to 18 mbar by 7 minute total evaporation time. Said steps were carried out without placing the flask into evaporator water bath. Thereafter, evaporation was continued by placing the flask into water bath (T=65° C.), rising the water bath temperature during 10 minutes to 80° C. Then, the evaporation was continued for additional 1 minute.

The resulting dispersion was weighted to 19.9 g. The oven dried nanodiamond sample weighted into 1.0 g, revealing that produced EG based nanodiamond dispersion nanodiamond concentration is 5.0 wt. %

Figure 13:
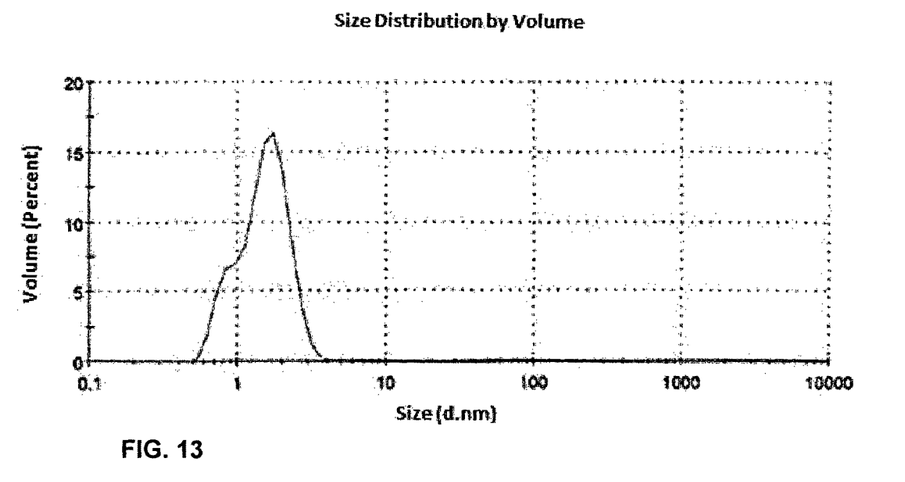
FIG. 13 shows particle size distribution of 5.0 wt. % single digit hydrogenated nanodiamond dispersion according to the present invention.

The prepared dispersion exhibited the following particle size distribution: D10: 0.825 nm; D50: 1.52 nm and D90:

2.34 nm. The particle size distribution curve is illustrated in FIG. 13. It was impossible to determine the produced dispersion zeta potential value accurately, but it carried a positive charge.

The invention claimed is:

1. A zeta positive hydrogenated nanodiamond powder comprising zeta positive hydrogenated nanodiamond particles, wherein
   i) zeta potential of the zeta positive hydrogenated nanodiamond particles as suspended in water is over +50 mV measured at pH higher than 7,
   ii) D50 average particle size distribution of the zeta positive hydrogenated nanodiamond particles is from 2 nm to 400 nm when measured after one hour ultrasonic treatment in water using Hielscher 400 W ultrasonic treatment.

2. Zeta positive hydrogenated nanodiamond powder according to claim 1, in form of a single digit hydrogenated nanodiamond dispersion, wherein the zeta positive hydrogenated nanodiamond particles are zeta positive single digit hydrogenated nanodiamond particles and the dispersion comprises the zeta positive single digit hydrogenated nanodiamond particles and a liquid medium, wherein
   i) zeta potential of the zeta positive single digit hydrogenated nanodiamond dispersion is over +50 mV measured at pH higher than 7,
   ii) D90 average particle size distribution of the zeta positive single digit hydrogenated nanodiamond particles in the dispersion is from 2 nm to 12 nm.

3. The zeta positive single digit hydrogenated nanodiamond dispersion according to claim 2, wherein the zeta potential of the zeta positive single digit hydrogenated nanodiamond dispersion is over +60 mV, measured at pH lower than or 7.

4. The zeta positive single digit hydrogenated nanodiamond dispersion according to claim 2, wherein the zeta positive single digit hydrogenated nanodiamond particle concentration in the dispersion is at least 0.2 wt-%.

5. The zeta positive single digit hydrogenated nanodiamond dispersion according to claim 2, wherein the liquid medium is selected from the group consisting of polar protic solvents, polar aprotic solvents, dipolar aprotic solvents, aromatic solvents, chlorinated solvents, ionic liquids, and a mixture of the solvents.

6. The zeta positive single digit hydrogenated nanodiamond dispersion according to claim 5, wherein
   the polar protic solvent is water, alcohol, linear aliphatic diol, branched diol or carboxylic acid; the polar aprotic solvent is tetrahydrofuran, propylene carbonate or lactam;
   the dipolar aprotic solvent is ketone, ester, N,N-methylformamide or dimethyl sulfoxide;
   the aromatic solvent is toluene, xylenes or benzene;
   the chlorinated solvent is dichloromethane, trichloroethylene or chloroform; and the ionic liquid is 1-ethyl-3-methylmidazolium chloride, 1-butyl-3-methylmidazolium chloride, 1-ethyl-3-methyl-imidazolium ethylsulfate, 1-ethyl-3-methyl imidazolium diethylphosphate, 1-ethyl-3-methyl-imidazolium dicyanamide, tris-(2-hydroxyethyl)-methylammonium methylsulfate, 1-ethyl-3-methyl-imidazolium thiocyanate, 1-ethyl-3-methyl-imidazolium tetrafluoroborate, 1-ethyl-3-methyl-imidazolium trifluoromethasulfonate, 1-ethyl-3-methyl-imidazolium bis (trifluoromethanesulfonyl)imide, 1-ethyl-3-methyl-imidazolium methylcarbonate or 1-butyl-3-methyl-imidazolium methylcarbonate.

7. The zeta positive single digit hydrogenated nanodiamond dispersion according to claim 2, wherein the liquid medium is selected from the group consisting of water, methanol, ethanol, iso-propanol, linear aliphatic diols, branched diols, N-methyl-2-pyrrolidone (NMP), N-ethyl-2-pyrrolidone (NEP) and dimethyl sulfoxide (DMSO), and a mixture of any said solvents.

8. The zeta positive single digit hydrogenated nanodiamond dispersion according to claim 2, wherein the D90 average particle size distribution of the zeta positive single digit hydrogenated nanodiamond particles is from 3 nm to 12 nm.

9. The zeta positive single digit hydrogenated nanodiamond dispersion according to claim 2, wherein pH of the zeta positive single digit hydrogenated nanodiamond dispersion is 1.5 to 13.

* * * * *